(12) United States Patent
Lei et al.

(10) Patent No.: US 11,571,082 B2
(45) Date of Patent: Feb. 7, 2023

(54) POT COVER ASSEMBLY

(71) Applicant: FOSHAN SHUNDE MIDEA ELECTRICAL HEATING APPLIANCES MANUFACTURING CO., LIMITED, Foshan (CN)

(72) Inventors: Jun Lei, Foshan (CN); Wenhua Liu, Foshan (CN); Yunfeng Wang, Foshan (CN); Shufeng Huang, Foshan (CN); Deyong Jiang, Foshan (CN); Fan Zhang, Foshan (CN); Weiming Huang, Foshan (CN)

(73) Assignee: FOSHAN SHUNDE MIDEA ELECTRICAL HEATING APPLIANCES MANUFACTURING CO., LTD., Foshan (CN)

(*) Notice: Subject to any disclaimer, the term of this patent is extended or adjusted under 35 U.S.C. 154(b) by 876 days.

(21) Appl. No.: 16/284,978

(22) Filed: Feb. 25, 2019

(65) Prior Publication Data

US 2019/0254462 A1    Aug. 22, 2019

Related U.S. Application Data

(63) Continuation of application No. PCT/CN2016/104290, filed on Nov. 2, 2016.

(30) Foreign Application Priority Data

Sep. 30, 2016 (CN) .......................... 201621099478.5
Sep. 30, 2016 (CN) .......................... 201621103458.0

(51) Int. Cl.
*A47J 27/56* (2006.01)
*A47J 36/06* (2006.01)

(52) U.S. Cl.
CPC ............... *A47J 27/56* (2013.01); *A47J 36/06* (2013.01)

(58) Field of Classification Search
CPC ........ H05B 6/062; H05B 3/685; H05B 3/746; A47J 27/56; A47J 36/06; A47J 27/62
USPC ................ 99/325, 331, 337, 342, 403, 496; 219/209, 400, 412, 413, 480, 502
See application file for complete search history.

(56) References Cited

U.S. PATENT DOCUMENTS

2012/0160820 A1* 6/2012 Kawata ................. H05B 6/062
                                                          219/209

FOREIGN PATENT DOCUMENTS

| CN | 104582545 A | 4/2015 |
| CN | 105212741 A | 1/2016 |
| CN | 205514101 U | 1/2016 |

(Continued)

OTHER PUBLICATIONS

Foshan Shunde Midea Electrical Heating Appliances Manufacturing Co. Ltd., International Search Report, PCT/CN2016/104290, dated Jun. 16, 2017, 16 pgs.

(Continued)

*Primary Examiner* — Phuong T Nguyen
(74) *Attorney, Agent, or Firm* — Morgan, Lewis & Bockius LLP

(57) ABSTRACT

The pot cover assembly includes a pot cover body and a spill-proof detection device. The spill-proof detection device is a capacitive detection device and it is provided on the pot cover body. At least a lower surface of the spill-proof detection device forms a detection plane and a capacitance value of the spill-proof detection device is changed as a function of a contact medium of the detection plane.

17 Claims, 7 Drawing Sheets

(56) References Cited

FOREIGN PATENT DOCUMENTS

| CN | 205041277 U | | 2/2016 | |
|---|---|---|---|---|
| CN | 205514101 | * | 8/2016 | ............. A47J 27/62 |
| EP | 2700338 A1 | | 2/2014 | |
| JP | H 105130 A | | 1/1998 | |
| JP | 2001070150 A | | 3/2001 | |
| JP | 5750586 B2 | | 7/2015 | |

OTHER PUBLICATIONS

Notification of Reason for Refusal, KR10201870206997, dated Jun. 19, 2019, 7 pgs.
Midea Group Co., Ltd., EP Office Action, European Patent Application No. 16917481.0, dated Mar. 20, 2020, 3 pgs.
Midea Group Co., Ltd., Extended European Search Report, EP 16917481.0, dated Aug. 13, 2019, 6 pgs.
Midea Group Co., Ltd., JP Office Action, Japanese Patent Application No. 2018-544776, dated Aug. 8, 2019, 16 pgs.
Midea Group Co., Ltd., WO, PCT/CN2016/104290, Jun. 16, 2017, 4 pgs.
Midea Group Co., Ltd., IPRP, PCT/CN2016/104290, Apr. 2, 2019, 5 pgs.

* cited by examiner

POT COVER ASSEMBLY

CROSS-REFERENCE TO RELATED APPLICATIONS

This patent application is a continuation application of PCT Patent Application No. PCT/CN2016/104290, entitled "POT COVER ASSEMBLY AND COOKING UTENSIL HAVING SAME" filed on Nov. 2, 2016, which claims priority to (i) Chinese Patent Application No. 201621099478.5, filed with Chinese Patent Office on Sep. 30, 2016 and (ii) Chinese Patent Application No. 201621103458.0, filed with Chinese Patent Office on Sep. 30, 2016, all of which are incorporated herein by reference in their entirety.

TECHNICAL FIELD

The present disclosure relates to a technical field of electric appliance manufacture, and specifically to a pot cover assembly and a cooking utensil having the pot cover assembly.

BACKGROUND

In order to realize a spill-proof function, cooking utensils such as an electric rice cooker are usually provided with a spill-proof detection device. The spill-proof detection device used in cooking utensils in the related art realizes the detection of an overflow signal by detecting an electrical resistance characteristic of water and requires at least two probes, which has high cost and poor sensitivity.

SUMMARY

The present disclosure aims to solve at least one of the above-mentioned technical problems in the related art to at least some extent. Accordingly, the present disclosure provides a pot cover assembly, which has advantages of low cost, timely spill-proof detection and the like.

The present disclosure also provides a cooking utensil having the pot cover assembly.

In order to realize the above-mentioned purpose, the first aspect of the present disclosure provides a pot cover assembly. The pot cover assembly includes a pot cover body and a spill-proof detection device. The spill-proof detection device is a capacitive detection device and is disposed to the pot cover body. At least a lower surface of the spill-proof detection device forms a detection surface, and a capacitance value of the spill-proof detection device changes with change of a contact state between a medium and the detection surface.

The pot cover assembly according to the present disclosure has advantages of low cost and timely spill-proof detection and the like.

In addition, the pot cover assembly according to the present disclosure can also have the additional technical features as follows.

According to an embodiment of the present disclosure, a lower end of the spill-proof detection device is not higher than an inner surface of the pot cover body.

According to an embodiment of the present disclosure, the pot cover body includes an outer cover and an inner cover. The inner cover is disposed at an inner side of the outer cover, the spill-proof detection device is disposed to at least one of the outer cover and the inner cover and the lower end of the spill-proof detection device is not higher than a lower surface of the inner cover.

According to an embodiment of the present disclosure, the inner cover is provided with a detection-device through hole, and at least a part of the spill-proof detection device is fitted in the detection-device through hole.

According to an embodiment of the present disclosure, an upper end of the spill-proof detection device is disposed to the outer cover and the lower end of the spill-proof detection device passes through the detection-device through hole.

According to an embodiment of the present disclosure, an upper end of the spill-proof detection device is disposed to the outer cover and the lower end of the spill-proof detection device is flush with the lower surface of the inner cover.

According to an embodiment of the present disclosure, the lower surface of the inner cover is provided with a lower annular projection extending along a circumferential direction of the detection-device through hole, and the lower end of the spill-proof detection device is not higher than a lower surface of the lower annular projection.

According to an embodiment of the present disclosure, the spill-proof detection device is arranged at a center of the pot cover body in a horizontal direction.

According to an embodiment of the present disclosure, a center of the pot cover body in a horizontal direction is provided with an air outlet, and the spill-proof detection device and the air outlet are spaced apart.

According to an embodiment of the present disclosure, the spill-proof detection device includes: an electric conductor; an insulator, the insulator covering at least a side surface and/or a lower surface of the electric conductor, a side surface and/or a lower surface of the insulator forming the detection surface, and the capacitance value of the electric conductor changing with change of the contact state between the medium and the detection surface; a capacitance detection chip, the capacitance detection chip being connected to the electric conductor and generating a detection signal by detecting a variation of the capacitance value of the electric conductor.

According to an embodiment of the present disclosure, the pot cover assembly further includes a main control chip. The main control chip is communicated with the capacitance detection chip so as to receive the detection signal and judge whether an overflow phenomenon occurs according to the detection signal.

According to an embodiment of the present disclosure, an electrical resistance is connected between the capacitance detection chip and the electric conductor.

According to an embodiment of the present disclosure, the electric conductor is in a spiral shape.

According to an embodiment of the present disclosure, the insulator covers at least the lower surface of the electric conductor and the lower surface of the insulator forms the detection surface.

According to an embodiment of the present disclosure, a detection sheet is provided below the electric conductor, and the detection sheet abuts against the insulator.

According to an embodiment of the present disclosure, the insulator covers at least the side surface of the electric conductor and the side surface of the insulator forms the detection surface.

According to an embodiment of the present disclosure, an outer side surface of the electric conductor is closely attached to an inner side surface of the insulator.

According to an embodiment of the present disclosure, the electric conductor includes a first electric conduction part and a second electric conduction part. The second electric conduction part is disposed above the first electric conduction part, and the second electric conduction part and the first electric conduction part is formed in one piece. A diameter of the second electric conduction part is larger than a diameter of the first electric conduction part. The insulator includes at least a first insulation wall covering a lower surface of the first electric conduction part and a second insulation wall covering a lower surface of the second electric conduction part. The detection surface includes a first detection surface formed by a lower surface of the first insulation wall and a second detection surface formed by a lower surface of the second insulation wall, and the capacitance value of the electric conductor changes with change of contact states between the medium and the first detection surface as well as the second detection surface.

According to an embodiment of the present disclosure, the insulator is provided with a second groove and a first groove disposed at a bottom wall of the second groove, a lower surface of the second electric conduction part abuts against the bottom wall of the second groove, and a lower surface of the first electric conduction part abuts against a bottom wall of the first groove.

According to an embodiment of the present disclosure, a lower surface of the first electric conduction part is provided with a first detection sheet and a lower surface of the second electric conduction part is provided with a second detection sheet.

According to an embodiment of the present disclosure, the first detection sheet and the first electric conduction part are formed in one piece, and the second detection sheet and the second electric conduction part are formed in one piece.

According to an embodiment of the present disclosure, the first electric conduction part is a first spring and the second electric conduction part is a second spring, the first detection sheet is formed by winding and flattening a lower end of the first spring, and the second detection sheet is formed by winding and flattening a lower end of the second spring.

A second aspect of the present disclosure provides a cooking utensil. The cooking utensil includes a cooker body; a pot cover assembly for opening and closing the cooker body, the pot cover assembly being the pot cover assembly according to the first aspect of the present disclosure.

By making use of the pot cover assembly according to the first aspect of the present disclosure, the cooking utensil according to the present disclosure has advantages of low cost, high reliability and the like.

According to an embodiment of the present disclosure, the cooking utensil is an electric rice cooker or an electric pressure cooker.

Figure 1:
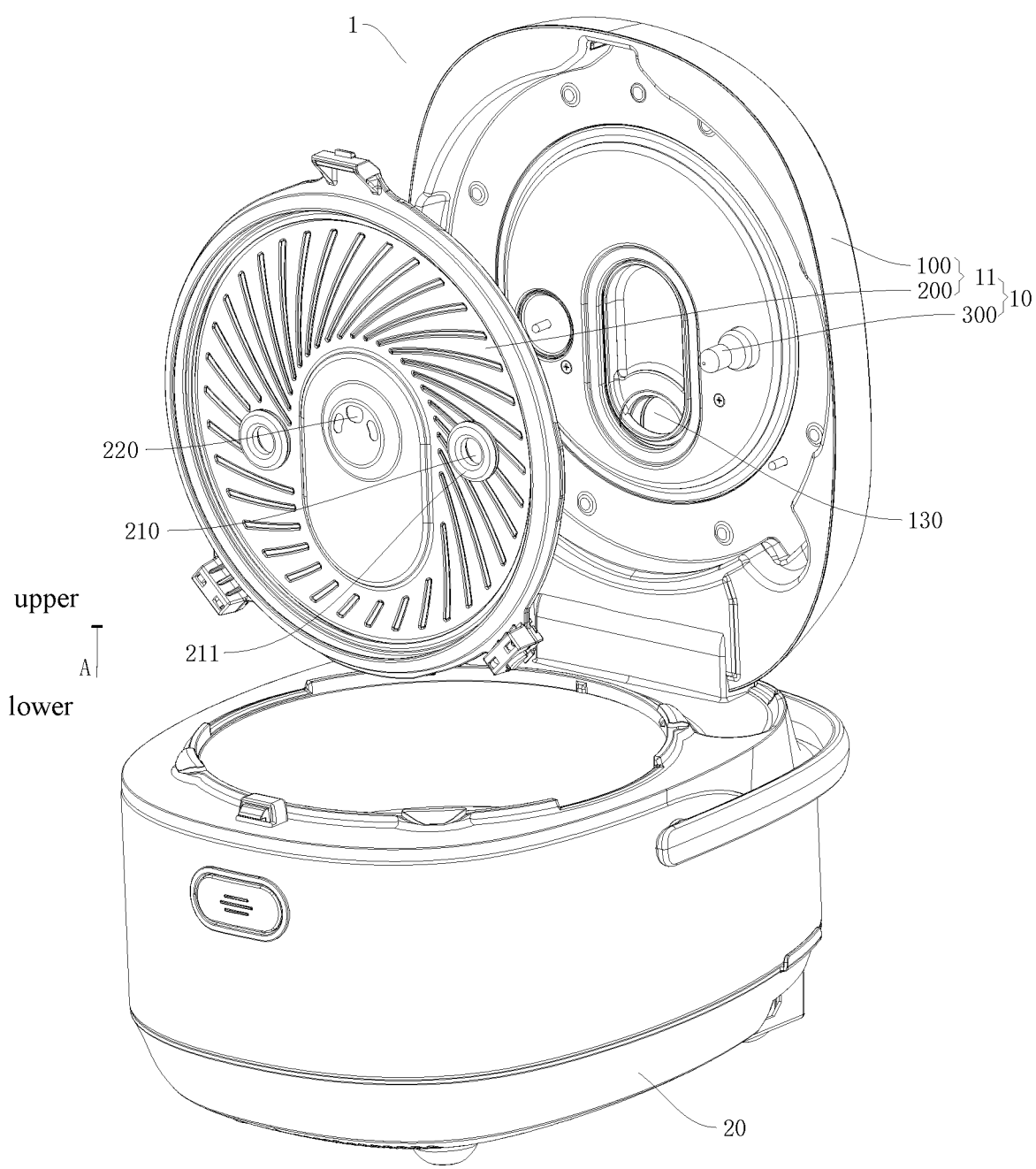
FIG. 1 is an exploded view of a cooking utensil according to embodiments of the present disclosure.

Reference numerals: cooking utensil 1, pot cover assembly 10, pot cover body 11, outer cover 100, inner cover 200, detection-device through hole 210, lower annular projection 211, air outlet 220, spill-proof detection device 300, electric conductor 310, insulator 320, detection surface 3200, capacitance detection chip 330, main control chip 340, electrical resistance 350, cooker body 20, detection sheet 3100, first electric conduction part 311, first detection sheet 3110, second electric conduction part 312, second detection sheet 3120, first insulation wall 321, first detection surface 3210, second insulation wall 322, second detection surface 3220.

DETAILED DESCRIPTION

The embodiments of the present disclosure are described in detail below, and examples of the embodiments are shown in the accompanying drawings, in which the same or similar reference numerals denote the same or similar elements or elements having the same or similar functions throughout. The embodiments described herein with reference to drawings are explanatory, illustrative, and used to generally understand the present disclosure, and cannot be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise" "axially," "radially," and "circumferentially" should be construed to refer to the orientation as then described or as shown in the drawings under discussion. These relative terms are for convenience of description and do not require that the present disclosure be constructed or operated in a particular orientation, thus cannot be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

A pot cover assembly 10 according to embodiments of the present disclosure is described below with reference to the accompanying drawings.

As illustrated in FIG. 1 to FIG. 7, the pot cover assembly 10 according to embodiments of the present disclosure includes a pot cover body 11 and a spill-proof detection device 300.

The spill-proof detection device 300 is a capacitive detection device and is disposed to the pot cover body 1. At least a lower surface of the spill-proof detection device 300 forms a detection surface 3200 (an up and down direction is indicated by an arrow A in FIG. 1 to FIG. 3), and a capacitance value of the spill-proof detection device 300 changes with change of a contact state between a medium and the detection surface 3200.

It can be understood by those skilled in the art that the capacitive detection device means that when the detection device is socked in the medium to be detected, the capacitance variation of the detection device is caused according to a capacitive sensing principle, and the capacitance variation is converted into a standard current signal, so as to realize spill-proof related control.

In the pot cover assembly 10 according to the embodiment of the present disclosure, by adopting the capacitive detection device as the spill-proof detection device 300, when a liquid (such as foam) in the cooking utensil contacts the spill-proof detection device 300, it is possible to realize a detection of the overflow signal by detecting a variation of the capacitance value. In this way, not only the spill-proof detection function can be realized, but also the cost of the spill-proof detection device 300 is reduced as compared with an electrical-resistance type detection method in the related art, thereby the cost of the cooking utensil is reduced, the probability of false judgment is decreased and the accuracy of spill-proof detection is improved.

Therefore, the pot cover assembly 10 according to embodiments of the present disclosure has the advantages of low cost, timely spill-proof detection and the like.

The pot cover assembly 10 according to specific embodiments of the present disclosure is described below with reference to the accompanying drawings.

Figure 2:
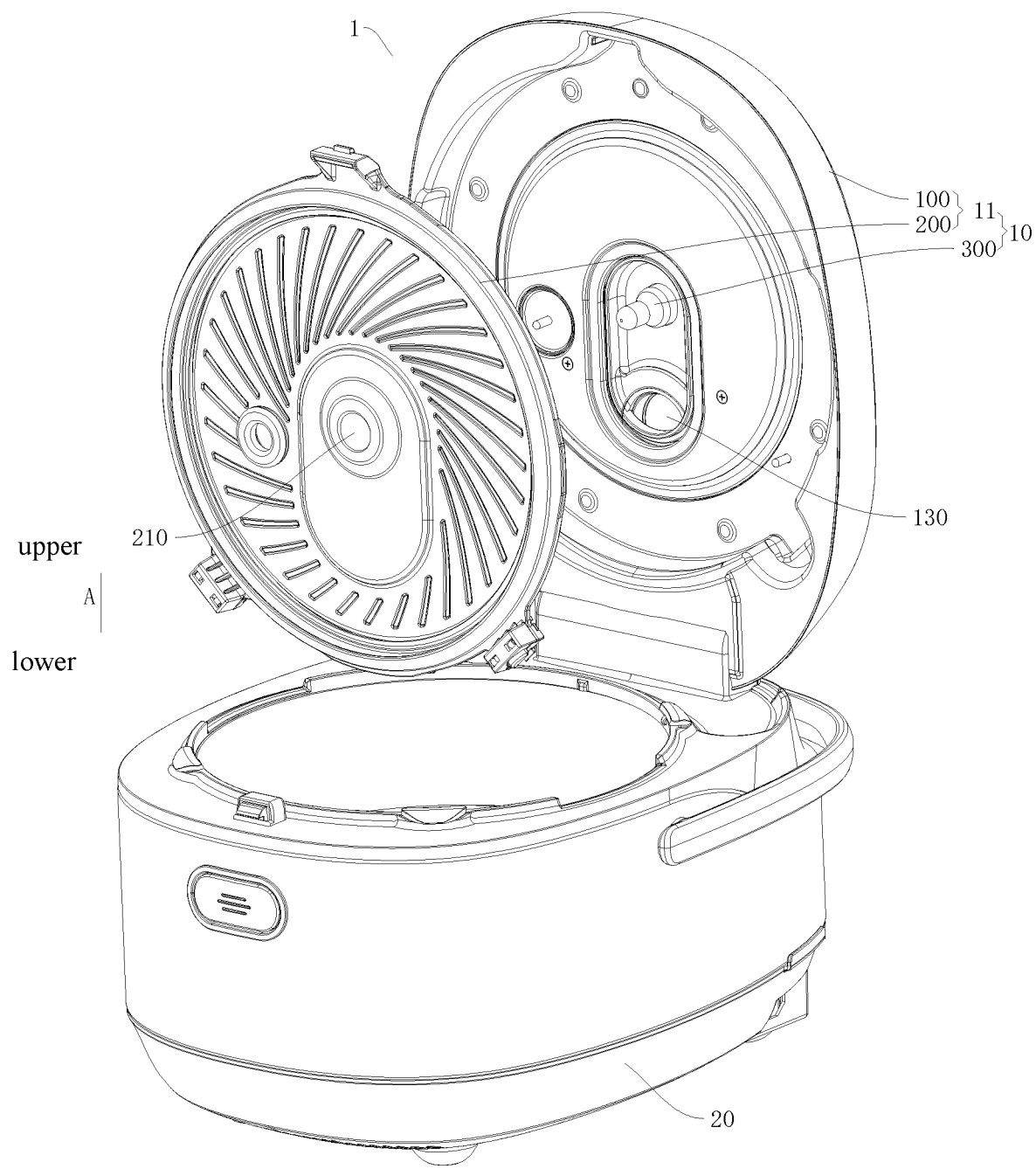
FIG. 2 is an exploded view of a cooking utensil according to embodiments of the present disclosure.
Figure 3:
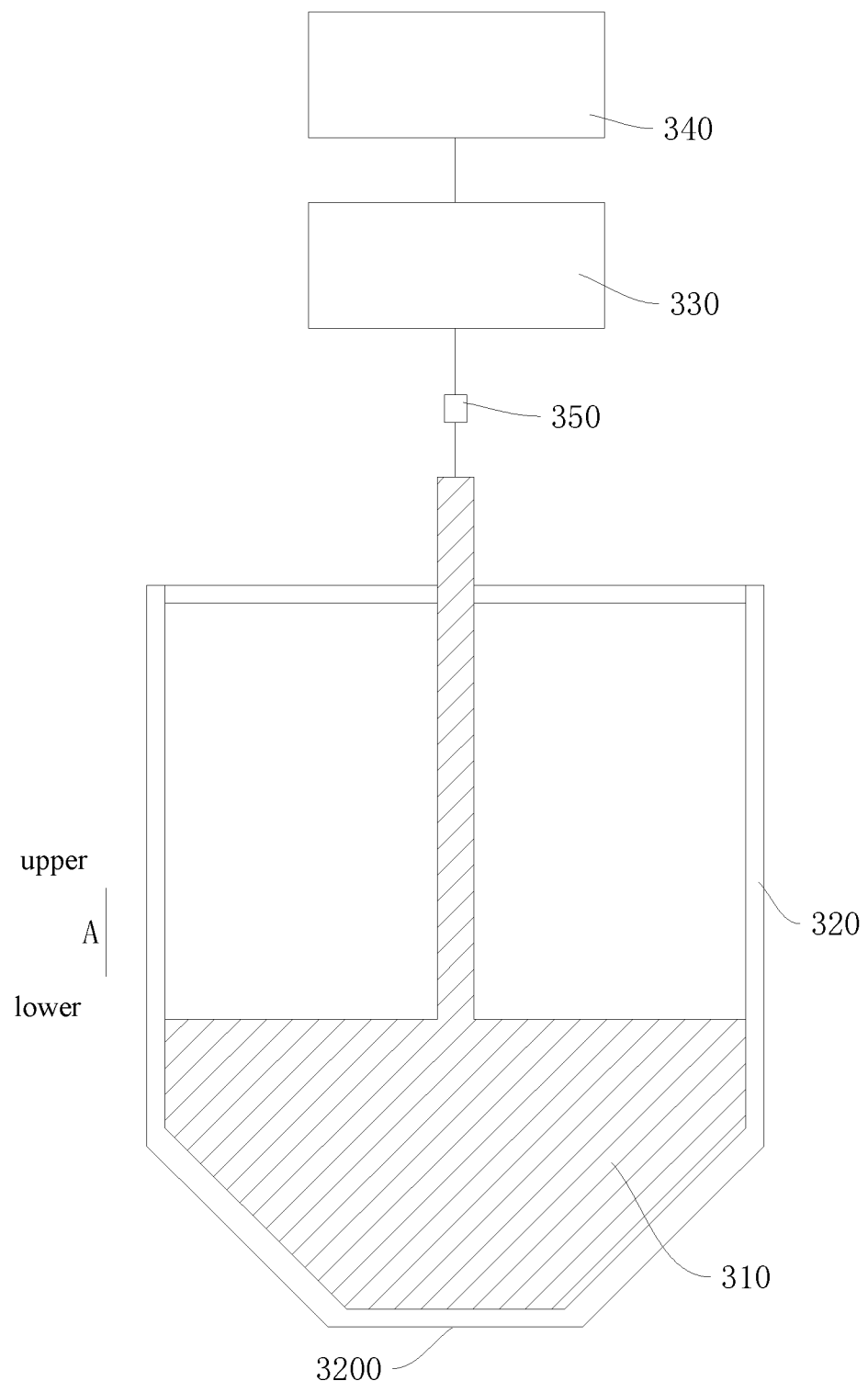
FIG. 3 is a schematic view of a spill-proof detection device of a pot cover assembly according to embodiments of the present disclosure.

In some specific embodiments of the present disclosure, as illustrated in FIG. 1 to FIG. 3, the pot cover assembly 10 according to embodiments of the present disclosure includes the pot cover body 11 and the spill-proof detection device 300.

A lower end of the spill-proof detection device 300 is not higher than an inner surface of the pot cover body 11. By making the lower surface of the spill-proof detection device 300 form the detection surface 3200 and the lower end of the spill-proof detection device 300 be not higher than the inner surface of the pot cover body 11, compared with a technical solution in which the spill-proof detection device 300 is disposed in the pot cover body 11, it is possible to reduce a height of the lower end of the spill-proof detection device 300 and prevent hysteresis of the spill-proof detection caused by that the liquid is detected by the spill-proof detection device 300 till entering the pot cover body 11, so that the detection by means of the spill-proof detection device 300 is more quickly and promptly, the liquid is prevented from overflowing the pot cover body 11 due to the heating of residual heat, and timeliness and reliability of the spill-proof function of the pot cover assembly 10 is guaranteed.

Specifically, the pot cover body 11 includes an outer cover 100 and an inner cover 200. The inner cover 200 is disposed at an inner side of the outer cover 100, the spill-proof detection device 200 is disposed to at least one of the outer cover 100 and the inner cover 200 and the lower end of the spill-proof detection device 300 is not higher than a lower surface of the inner cover 200. In this way, the inner cover 200 can be used to play a role in blocking the foam and prevent the foam from directly overflowing the pot cover body 11. In addition, since the lower end of the spill-proof detection device 300 is not higher than the lower surface of the inner cover 200, it is possible to further ensure the timeliness of the detection by the spill-proof detection device 300 and prevent the liquid from overflowing caused by the detection hysteresis.

Advantageously, as illustrated in FIG. 1 to FIG. 2, the inner cover 200 is provided with a detection-device through hole 210, and at least a part of the spill-proof detection device 300 is fitted in the detection-device through hole 210. In this way, the detection-device through hole 210 can be utilized to avoid the spill-proof detection device 300, which facilitates the arrangement of the spill-proof detection device 300 so as to ensure that the lower end of the spill-proof detection device 300 is not lower than the lower surface of the inner cover 200.

In a specific embodiment of the present disclosure, an upper end of the spill-proof detection device 300 is disposed to the outer cover 100 and the lower end of the spill-proof detection device 300 passes through the detection-device through hole 210. In this way, it is possible to make the lower end of the spill-proof detection device 300 extend out of the detection-device through hole 210 further, the lower end of the spill-proof detection device 300 go deeper into the pot of the cooking utensil, and the detection surface 3200 be more adjacent to the liquid level in the pot, thus further improving the timeliness of detection.

In another specific embodiment of the present disclosure, an upper end of the spill-proof detection device 300 is disposed to the outer cover 100 and the lower end of the spill-proof detection device 300 is flush with the lower surface of the inner cover 200. In this way, the spill-proof detection device 300 can generate the detection signal when the liquid in the pot reaches the lower surface of the inner cover 200, which also ensures the timeliness of the detection.

Specifically, as illustrated in FIG. 1, the lower surface of the inner cover 200 is provided with a lower annular projection 211 extending along a circumferential direction of the detection-device through hole 210, and the lower end of the spill-proof detection device 300 is not higher than a lower surface of the lower annular projection 211. In this way, it is possible to facilitate the formation of the detection-device through hole 210 and ensure that the spill-proof detection device 300 is below the lower surface of the lower annular projection 211, thereby guaranteeing the timeliness of the detection.

In a specific embodiment of the present disclosure, as illustrated in FIG. 2, the spill-proof detection device 300 is arranged at a center of the pot cover body 11 in a horizontal direction. In this way, it is possible to facilitate the detection of the tendency of the liquid in the center of the pot to overflow, thus further guaranteeing the timeliness of the detection.

In another specific embodiment of the present disclosure, as illustrated in FIG. 1, a center of the pot cover body 11 in a horizontal direction is provided with an air outlet 220, and the spill-proof detection device 300 and the air outlet 220 are spaced apart. In this way, it is possible to facilitate the arrangement of the air outlet 220 and hence the discharge of gas through the air outlet 220.

FIG. 3 illustrates the cooking utensil 1 according to a specific example of the present disclosure. As illustrated in FIG. 3, the pot cover assembly 10 further includes a capacitance detection chip 330.

Specifically, the spill-proof detection device 300 includes an electric conductor 310 and an insulator 320. The insulator 320 covers at least a lower surface of the electric conductor 310. A lower surface of the insulator 320 forms the detection surface 3200. A capacitance value of the electric conductor 310 changes with change of the contact state between the medium and the detection surface 3200. The capacitance detection chip 330 is connected to the electric conductor 310 and generates a detection signal by detecting a variation of the capacitance value of the electric conductor 310. In this way, at least the lower surface of the insulator 320 can be utilized to constitute the detection surface 3200. When the liquid in the cooking utensil contacts the detection surface 3200, the capacitance value of the electric conductor 310 changes, and the capacitance detection chip 330 detects the change of the capacitance value of the electric conductor 310 and generates the detection signal, so as to detect whether the liquid overflows and realize the function of spill-proof detection.

More specifically, as illustrated in FIG. 3, the spill-proof detection device 300 further includes a main control chip 340. The main control chip 340 is communicated with the capacitance detection chip 330 so as to receive the detection signal and judge whether an overflow phenomenon occurs according to the detection signal. In this way, the main control chip 340 can be utilized to judge whether the liquid overflows, thus facilitating the control of a cooking state of the cooking utensil.

Advantageously, as illustrated in FIG. 3, an electrical resistance 350 is connected between the capacitance detection chip 330 and the electric conductor 310. The electrical resistance 350 is used for performing filter processing on a variation signal of the capacitance value of the electric conductor 200 so as to play a role in anti-interference. The electrical resistance value of the electrical resistance 350 may preferably be 10Ω to 10 kΩ.

Specifically, the inner cover 200 can be detachably disposed to the outer cover 100.

The spill-proof detection device 300 used in the cooking utensil according to another specific embodiment is described below with reference to the accompanying drawings.

As illustrated in FIG. 4 to FIG. 7, the spill-proof detection device 300 used in the cooking utensil according to embodiments of the present disclosure includes the electric conductor 310, the insulator 320 and the capacitance detection chip 330.

The electric conductor 310 is in a spiral shape. The insulator 320 covers at least a side surface and/or a lower surface (the up and down direction is indicated by an arrow A in FIG. 4 to FIG. 7) of the electric conductor 310, a side surface and/or a lower surface of the insulator 320 forms the detection surface 3200, and the capacitance value of the electric conductor 310 changes with change of the contact state between the medium and the detection surface 3200. The capacitance detection chip 330 is connected to the electric conductor 310 and generates a detection signal by detecting the variation of the capacitance value of the electric conductor 310.

In the spill-proof detection device 300 used in the cooking utensil according to embodiments of the present disclosure, by providing the electric conductor 310 and the insulator 320, the capacitance value of the electric conductor 310 can be changed with change of the contact state between the medium and the insulator 320, so as to judge the change of the contact state between the spill-proof detection device 300 and the medium by detecting the capacitance value of the electric conductor 310, and to judge whether there is a tendency of the liquid (such as foam) in the cooking utensil to overflow, thereby achieving the function of spill-proof detection.

In addition, by using the capacitive sensing principle and adopting the capacitive detection device as the spill-proof detection device 300, the spill-proof detection function can be realized, and moreover, compared with the electrical-resistance type detection method in the related art, the cost of the spill-proof detection device 300 is reduced, the probability of false judgment is decreased and the accuracy of spill-proof detection is improved.

In addition, by forming the electric conductor 310 into the spiral shape, not only the material cost of the electric conductor 310 can be reduced, but also the electric conductor 310 can exhibit elasticity to some extent, so that the electric conductor 310 can be closely attached to the insulator 320 more easily, thus ensuring the consistency of the detection signal of the spill-proof detection device 300 used for cooking utensils and further improving the accuracy and reliability of the detection of the spill-proof detection device 300.

Therefore, the spill-proof detection device 300 for the cooking utensil according to embodiments of the present disclosure has the advantages of low cost, high reliability, and the like.

Figure 5:
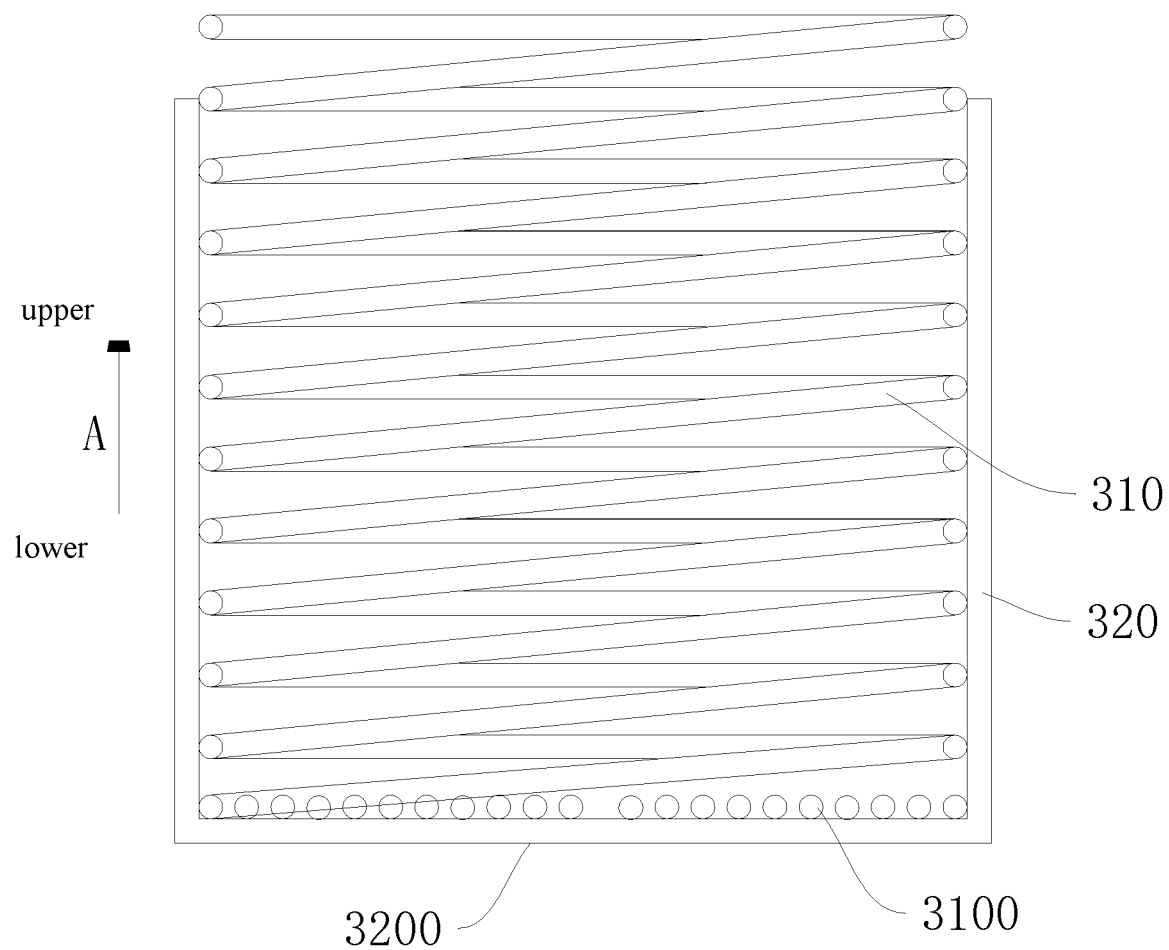
FIG. 5 is a schematic view of a spill-proof detection device of a cooking utensil according to another embodiment of the present disclosure.

In a specific embodiment of the present disclosure, as illustrated in FIG. 5, the insulator 320 covers at least the lower surface of the electric conductor 310 and the lower surface of the insulator 320 forms the detection surface 3200. In this way, the lower surface of the insulator 320 can be used to detect the height of the liquid level, the detection surface 3200 is enabled to be more adjacent to the liquid level, so that the spill-proof detection is more timely and reliable and it is convenient to stop the heating of the cooking utensil in time.

Specifically, as illustrated in FIG. 5, a detection sheet 3100 is provided below the electric conductor 310, and the detection sheet 310 abuts against the insulator 320. In this way, the electric conductor 310 is allowed to contact the insulator 320 through the detection sheet 3100, ensuring contact area with the insulator 320, thereby further improving the reliability and accuracy of the detection.

More specifically, the detection sheet 3100 may be a plate made of a conductive material and be fixedly connected to the electric conductor 310. Alternatively, the detection sheet 3100 may be formed by winding and flattening an end of the electric conductor 310, and specifically, diameters of coils formed by winding gradually decrease in a direction away from the electric conductor and the coils are flattened in a plane by abutting against the insulator 320, thus the reliability and accuracy of the detection is improved.

Figure 6:
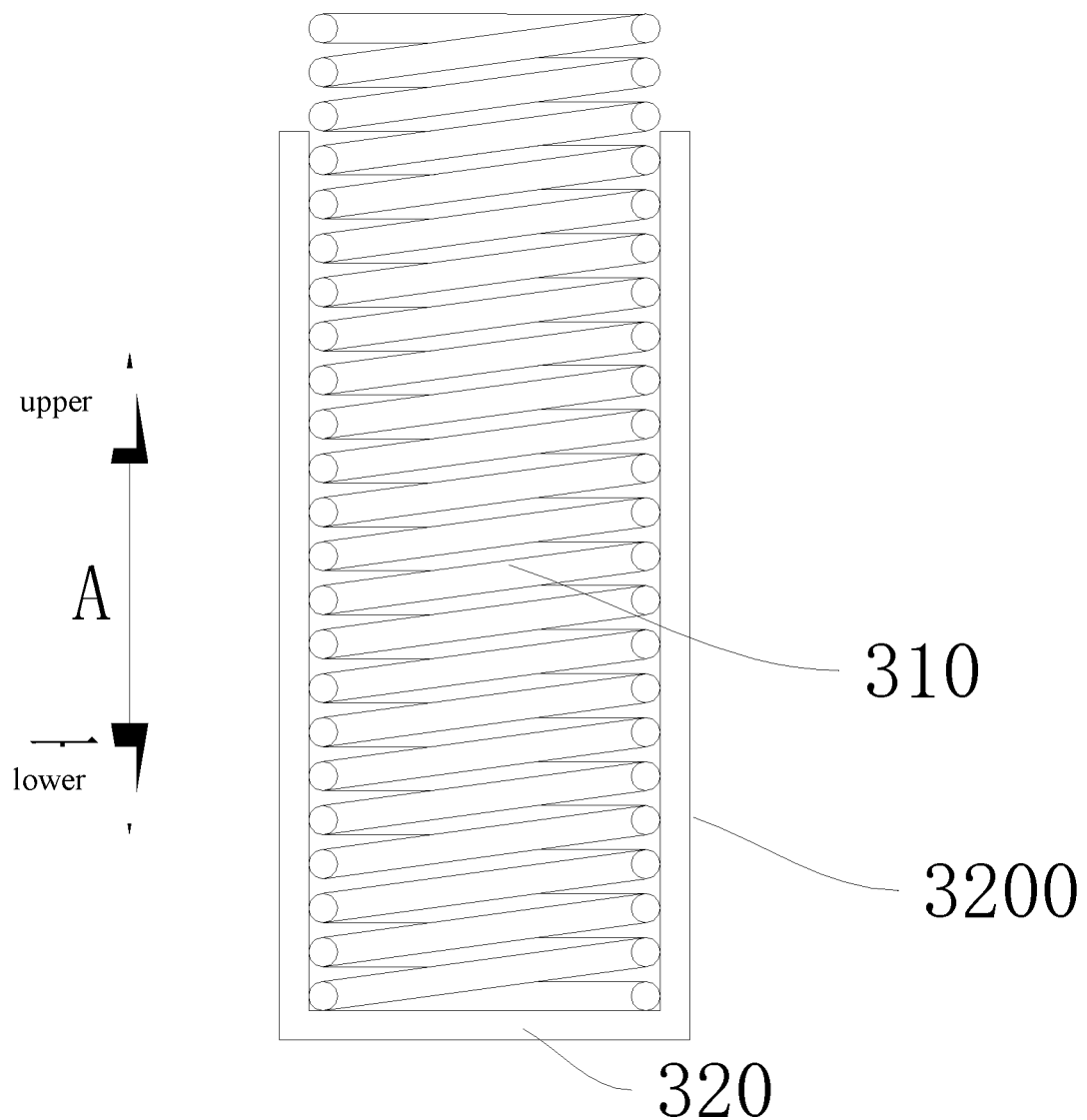
FIG. 6 is a schematic view of a spill-proof detection device of a cooking utensil according to another embodiment of the present disclosure.

In another specific embodiment of the present disclosure, as illustrated in FIG. 6, the insulator 320 covers at least the side surface of the electric conductor 310 and the side surface of the insulator 320 forms the detection surface 3200. In this way, the side surface of the insulator 320 can be utilized to detect a height of the liquid level, the detection surface 3200 is enabled to have a certain length in a vertical direction, thereby it is convenient for the spill-proof detection device 300 to detect a rising trend of the liquid level and facilitates the control of the heating effect of the cooking utensil.

Specifically, as shown in FIG. 6, an outer side surface of the electric conductor 310 is closely attached to an inner side surface of the insulator 320, so that the contact between the electric conductor 310 and the insulator 320 is made more reliable, thereby further ensuring the reliability and accuracy of the detection.

Figure 7:
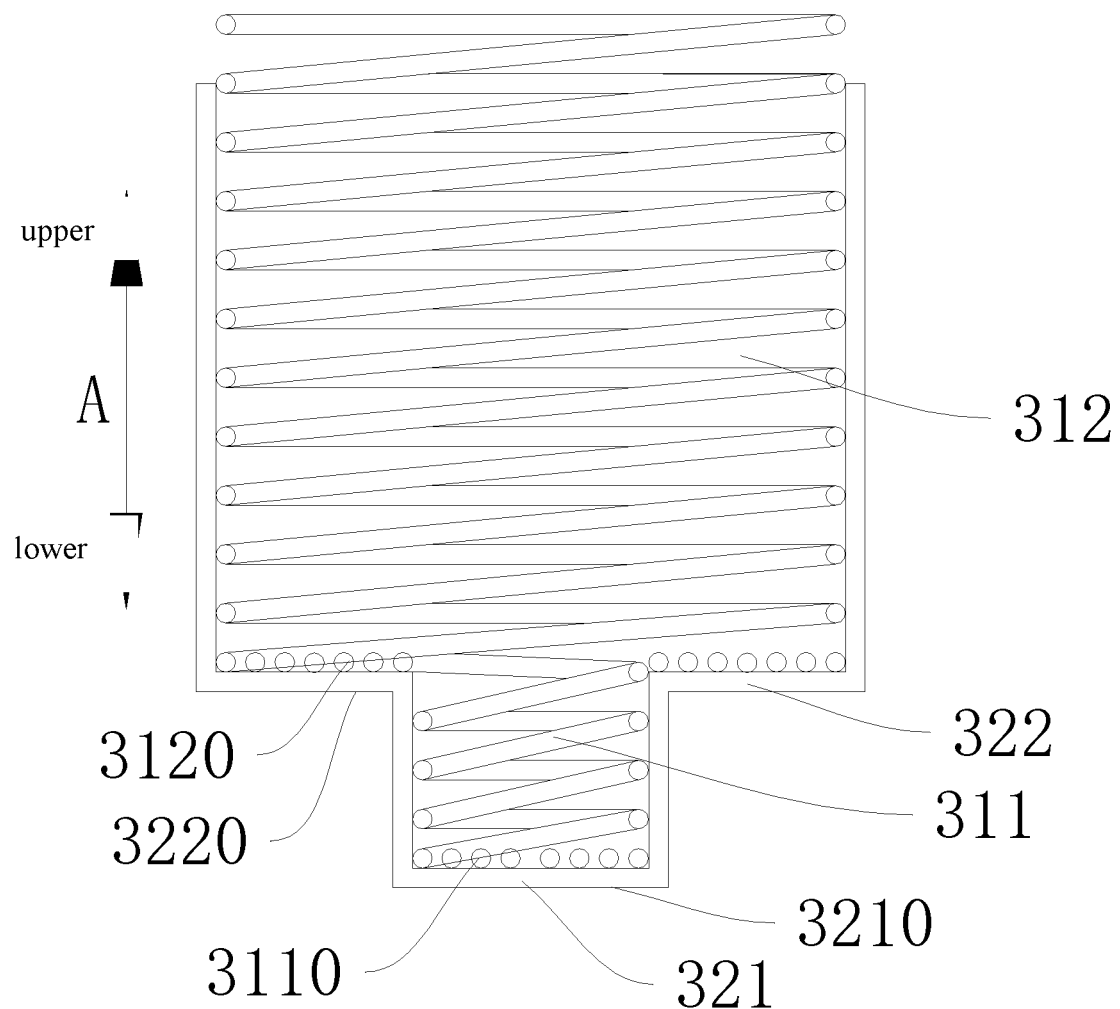
FIG. 7 is a schematic view of a spill-proof detection device of a cooking utensil according to another embodiment of the present disclosure.

In a further specific embodiment of the present disclosure, as illustrated in FIG. 7, the electric conductor 310 includes a first electric conduction part 311 and a second electric conduction part 312. The second electric conduction part 312 is disposed above the first electric conduction part 311, and the second electric conduction part 312 and the first electric conduction part 311 are formed in one piece. A diameter of the second electric conduction part 312 is larger than a diameter of the first electric conduction part 311. The insulator 320 includes at least a first insulation wall 321 covering a lower surface of the first electric conduction part 311 and a second insulation wall 322 covering a lower surface of the second electric conduction part 312. The detection surface 3200 includes a first detection surface 3210 formed by a lower surface of the first insulation wall 321 and a second detection surface 3220 formed by a lower surface of the second insulation wall 322, and the capacitance value of the electric conductor 310 changes with change of contact states between the medium and the first detection surface 3210 as well as the second detection surface 3220. The spill-proof detection device 300 can be provided with the first detection surface 3210 and the second detection surface 3220 by providing the first electric induction part 311 and the second electric conduction part 312 and providing the insulator 320 with the first insulation wall 321 and the second insulation wall 322. In this way, when the cooking utensil operates, the liquid level inside the cooking utensil rises and firstly contacts the lower one of the first detection surface 3210 and the second detection surface 3220, so that the capacitance detection chip 330 generates the detection signal and the cooking utensil is controlled to adjust the heating effect, for example, to lower a heating temperature and decrease a rising speed of the liquid level. After that, if the liquid level continues rising and contacts the higher one of the first detection surface 3210 and the second detection surface 3220, the detection signal of the capacitance detection chip 330 is enabled to change and the cooking utensil is further controlled to adjust the heating effect, for example, to stop the heating and prevent the liquid from overflowing the cooking utensil as the liquid level continues rising, thus realizing the spill-proof function. As a result, the cooking utensil can be controlled to switch to different cooking states when the liquid level in the cooking utensil reaches different heights, compared with the method of stopping heating directly when the liquid level rising is detected, the heating effect of the cooking utensil on the food can be ensured, the food is heated sufficiently, and the cooking effect of the cooking utensil is guaranteed, and moreover, the rising speed of the liquid level can be reduced when the liquid level contacts the spill-proof detection device 300 for the first time, thereby preventing the liquid from directly overflowing the cooking utensil and increasing the reliability of spill-proof detection device 300.

Specifically, as illustrated in FIG. 7, the insulator 320 is provided with a second groove and a first groove disposed at a bottom wall of the second groove, a lower surface of the second electric conduction part abuts against the bottom wall of the second groove, and a lower surface of the first electric conduction part abuts against a bottom wall of the first groove. Specifically, the insulator 320 further includes a lower circumferential wall connecting the first insulation wall 321 and the second insulation wall 322 and an upper circumferential wall surrounding the second insulation wall 322 and extending upwards. In this way, the first electric conduction part 311 can be covered with the first insulation wall 321, and the second electric conduction part 312 can be covered with the second insulation wall 322, the formation of the first detection surface 3210 and the second detection surface 3220 can be realized. The first insulation wall 321 and the second insulation wall 322 are integrally connected to improve the integrity and structural strength of the insulator 320 and simplify the assembly process of the spill-proof detection device 300.

More specifically, as illustrated in FIG. 7, a lower surface of the first electric conduction part 311 is provided with a first detection sheet 3110 and a lower surface of the second electric conduction part 312 is provided with a second detection sheet 3120. In this way, the first electric conduction part 311 can contact the first insulation wall 321 through the first detection sheet 3110, and the second electric conduction part 312 can contact the second insulation wall 322 through the second detection sheet 3120, thereby increasing the contact area of the first insulation wall 321 and the second insulation wall 322, further facilitating the detection of changes of the medium and further improving the accuracy and reliability of the detection of the spill-proof detection device 300.

Advantageously, the first detection sheet 3110 and the first electric conduction part 311 are formed in one piece, and the second detection sheet 3120 and the second electric conduction part 312 are formed in one piece. In this way, the assembly process of the spill-proof detection device 300 can be further simplified and the production efficiency of the spill-proof detection device 300 can be improved.

More advantageously, as illustrated in FIG. 7, the first electric conduction part 311 is a first spring and the second electric conduction part 312 is a second spring. The first detection sheet 3110 is formed by winding and flattening a lower end of the first spring, and the second detection sheet 3120 is formed by winding and flattening a lower end of the second spring, which can facilitate the formation of the first detection sheet 3110 and the second detection sheet 3120, reduce the manufacturing difficulty and the manufacturing cost of the spill-proof detection device 300, improve the connection strength of the first electric induction part 311 and the first detection sheet 3110, and improve the connection strength of the second electric induction part 312 and the second detection sheet 3120.

Figure 4:
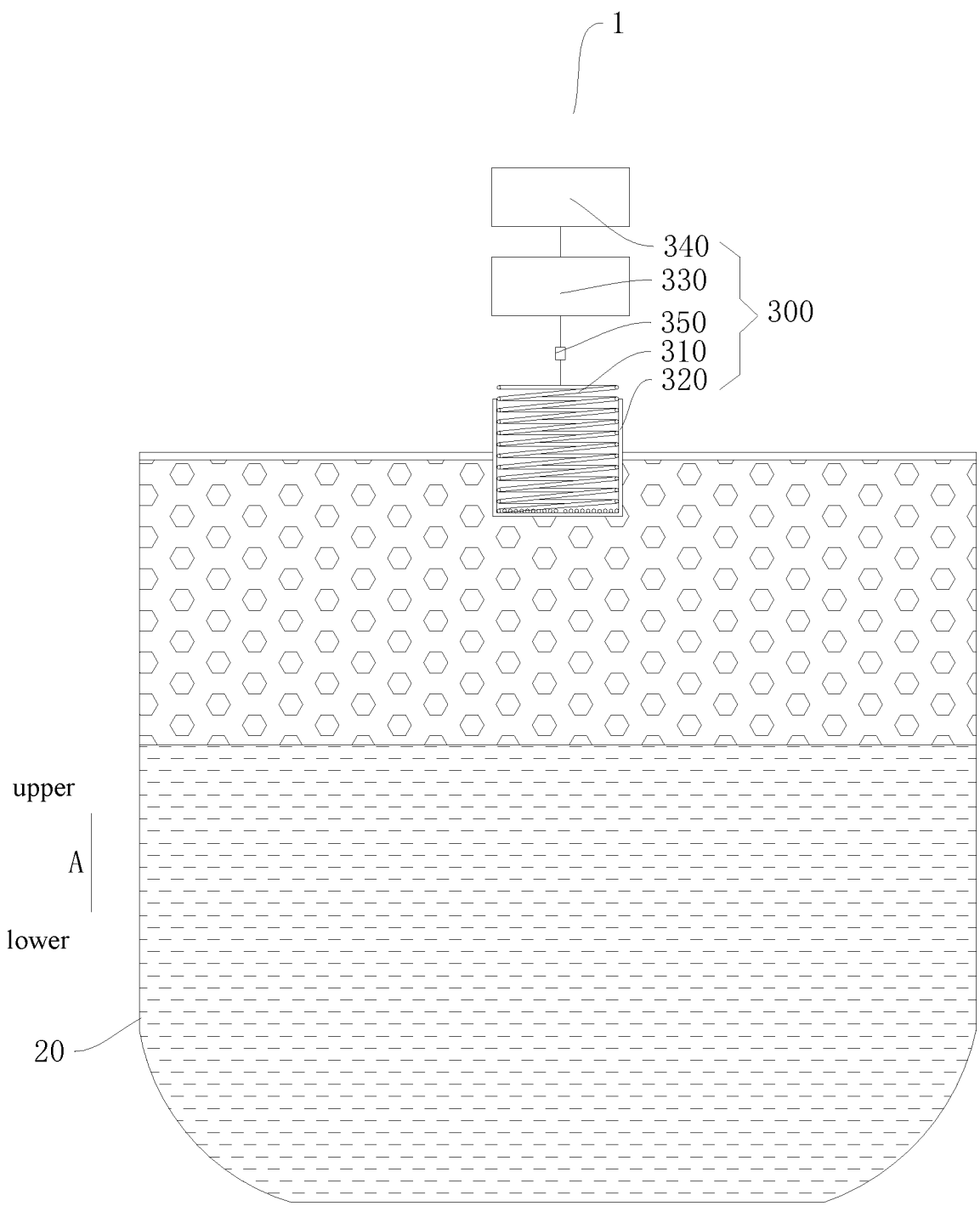
FIG. 4 is a schematic view of a cooking utensil according to another embodiment of the present disclosure.

Specifically, as illustrated in FIG. 4, the spill-proof detection device 300 further includes the main control chip 340. The main control chip 340 is communicated with the capacitance detection chip 330 so as to receive the detection signal and judge whether the overflow phenomenon occurs according to the detection signal. In this way, the main control chip 340 can be utilized to judge whether the liquid overflows, thus facilitating the control of the cooking state of the cooking utensil.

The electrical resistance 350 is connected between the capacitance detection chip 330 and the electric conductor 310. The electrical resistance 350 is used for performing filter processing on the variation signal of the capacitance value of the electric conductor 200 so as to play a role in anti-interference. The electrical resistance value of the electrical resistance 350 may preferably be 10Ω to 10 kΩ.

The cooking utensil 1 according to embodiments of the present disclosure is described below. The cooking utensil 1 according to embodiments of the present disclosure includes a cooker body 20 and the pot cover assembly.

The pot cover assembly is used for opening and closing the cooker body 20, and the pot cover assembly is the pot cover assembly 10 according to the above-mentioned embodiments of the present disclosure.

The cooking utensil 1 according to the embodiments of the present disclosure has the advantages of low cost, high reliability and the like by utilizing the pot cover assembly 10 according to the above embodiments of the present disclosure.

Optionally, the cooking utensil 1 is an electric rice cooker or an electric pressure cooker. In this way, a capacitive spill-proof detection function can be realized in the electric rice cooker or the electric pressure cooker, the cooking effect of the electric rice cooker or the electric pressure cooker can be improved, and the cost of the electric rice cooker or the electric pressure cooker can be reduced.

Other constructions or operations of the cooking utensil 1 according to embodiments of the present disclosure are known to those skilled in the art, which will not be described in detail here.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art may combine and combine the different embodiments or examples described in this specification and features of different embodiments or examples without conflicting with each other.

Although embodiments have been shown and described, it would be appreciated that the above embodiments are explanatory cannot be construed to limit the present disclosure, and changes, alternatives, and modifications can be made in the embodiments by those skilled in the art in the scope of the present disclosure.

What is claimed is:

1. A pot cover assembly, comprising:
   a pot cover body;
   an electric conductor in a spiral shape;
   an insulator, and
   a spill-proof detection device, the spill-proof detection device being a capacitive detection device and being disposed to the pot cover body, at least a lower surface of the spill-proof detection device forming a detection surface, and a capacitance value of the spill-proof detection device changing with change of a contact state between a medium and the detection surface,
   wherein the electric conductor comprises:
   a first electric conduction part; and
   a second electric conduction part, the second electric conduction part being disposed above the first electric conduction part, the second electric conduction part and the first electric conduction part being formed in one piece, a diameter of the second electric conduction part being larger than a diameter of the first electric conduction part, the insulator comprising at least a first insulation wall covering a lower surface of the first electric conduction part and a second insulation wall covering a lower surface of the second electric conduction part, the detection surface comprising a first detection surface formed by a lower surface of the first insulation wall and a second detection surface formed by a lower surface of the second insulation wall, and the capacitance value of the electric conductor changing with change of contact states between the medium and the first detection surface as well as the second detection surface.

2. The pot cover assembly according to claim 1, wherein a lower end of the spill-proof detection device is not higher than an inner surface of the pot cover body.

3. The pot cover assembly according to claim 1, wherein the pot cover body comprises:
   an outer cover; and
   an inner cover disposed at an inner side of the outer cover, the spill-proof detection device being disposed to at least one of the outer cover and the inner cover and the lower end of the spill-proof detection device being not higher than a lower surface of the inner cover.

4. The pot cover assembly according to claim 3, wherein the inner cover is provided with a detection-device through hole, and at least a part of the spill-proof detection device is fitted in the detection-device through hole.

5. The pot cover assembly according to claim 4, wherein an upper end of the spill-proof detection device is disposed to the outer cover and the lower end of the spill-proof detection device passes through the detection-device through hole.

6. The pot cover assembly according to claim 4, wherein an upper end of the spill-proof detection device is disposed to the outer cover and the lower end of the spill-proof detection device is flush with the lower surface of the inner cover.

7. The pot cover assembly according to claim 4, wherein the lower surface of the inner cover is provided with a lower annular projection extending along a circumferential direction of the detection-device through hole, and the lower end of the spill-proof detection device is not higher than a lower surface of the lower annular projection.

8. The pot cover assembly according to claim 1, wherein the spill-proof detection device is arranged at a center of the pot cover body in a horizontal direction.

9. The pot cover assembly according to claim 1, wherein a center of the pot cover body in a horizontal direction is provided with an air outlet, and the spill-proof detection device and the air outlet are spaced apart.

10. The pot cover assembly according to claim 1, wherein the insulator covering at least a side surface, or a lower surface of the electric conductor, a side surface, or a lower surface of the insulator forming the detection surface, and the capacitance value of the electric conductor changing with change of the contact state between the medium and the detection surface; and
    a capacitance detection chip, the capacitance detection chip being connected to the electric conductor and generating a detection signal by detecting a variation of the capacitance value of the electric conductor.

11. The pot cover assembly according to claim 10, further comprising:
    a main control chip, the main control chip communicating with the capacitance detection chip so as to receive the detection signal and judge whether an overflow phenomenon occurs according to the detection signal.

12. The pot cover assembly according to claim 10, wherein an electrical resistance is connected between the capacitance detection chip and the electric conductor.

13. The pot cover assembly according to claim 1, wherein the insulator covers at least the lower surface of the electric conductor, and the lower surface of the insulator forms the detection surface.

14. The pot cover assembly according to claim 13, wherein a detection sheet is provided below the electric conductor, and the detection sheet abuts against the insulator.

15. The pot cover assembly according to claim 1, wherein the insulator covers at least the side surface of the electric conductor and the side surface of the insulator forms the detection surface.

16. The pot cover assembly according to claim 1, wherein the insulator is provided with a second groove and a first groove disposed at a bottom wall of the second groove, a lower surface of the second electric conduction part abuts against the bottom wall of the second groove, and a lower surface of the first electric conduction part abuts against a bottom wall of the first groove.

17. The pot cover assembly according to claim 1, wherein a lower surface of the first electric conduction part is provided with a first detection sheet and a lower surface of the second electric conduction part is provided with a second detection sheet.

\* \* \* \* \*